US011182316B2

(12) United States Patent
Partlow et al.

(10) Patent No.: US 11,182,316 B2
(45) Date of Patent: Nov. 23, 2021

(54) PROGRAM INTERRUPT CODE CONVERSION

(71) Applicant: INTERNATIONAL BUSINESS MACHINES CORPORATION, Armonk, NY (US)

(72) Inventors: Steven Partlow, Beacon, NY (US); Elpida Tzortzatos, Lagrangeville, NY (US); Peter Jeremy Relson, Ulster Park, NY (US); James H. Mulder, Wappingers Falls, NY (US); Christopher Lee Wood, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 16/416,381

(22) Filed: May 20, 2019

(65) Prior Publication Data

US 2020/0371976 A1 Nov. 26, 2020

(51) Int. Cl.
*G06F 13/24* (2006.01)
*G06F 9/30* (2018.01)
*G06F 9/38* (2018.01)

(52) U.S. Cl.
CPC .......... *G06F 13/24* (2013.01); *G06F 9/3004* (2013.01); *G06F 9/3861* (2013.01)

(58) Field of Classification Search
CPC ...... G06F 9/4812; G06F 9/3861; G06F 13/24; G06F 9/3004; G06F 11/36; G06F 2209/481

(Continued)

(56) References Cited

U.S. PATENT DOCUMENTS 6,205,560 B1 * 3/2001 Hervin ................ G06F 11/2236
712/227
7,953,914 B2 * 5/2011 Gollub .................. G06F 11/073
710/266

(Continued)

OTHER PUBLICATIONS

Disclosed Anonymously "Method for Case Context Search in Software Code"; IP.com No. IPCOM000220245D; IP.com Publication Date: Jul. 27, 2012; 8 Pages.

(Continued)

*Primary Examiner* — Chun Kuan Lee
(74) *Attorney, Agent, or Firm* — Cantor Colburn LLP; Teddi Maranzano

(57) ABSTRACT

Interrupt code conversion for efficient computer program recovery. In response to an error being detected while processing instructions of a computer program running on a computer system, the OS receives a first program interrupt code (PIC) and interrupts the computer program. Control of the computer program is passed to a program interrupt handler and the program interrupt handler inspects the first PIC issued as a result of detecting the error. The first PIC is converted to a second PIC wherein the second PIC is associated with another error predicted when subsequent running of the computer program occurs. The second PIC is presented to a recovery routine associated with the computer program and, in response to the detected error, running of the computer program is customized based on the second PIC rather than the first PIC.

15 Claims, 3 Drawing Sheets

(58) Field of Classification Search
USPC .......................................................... 710/260
See application file for complete search history.

(56) References Cited

U.S. PATENT DOCUMENTS

| | | | |
|---|---|---|---|
| 9,317,460 B2 | 4/2016 | Greiner et al. | |
| 10,908,987 B1* | 2/2021 | Pandey | G06F 3/0659 |
| 2004/0015627 A1* | 1/2004 | Desoli | G06F 9/45504 |
| | | | 710/260 |
| 2004/0186674 A1* | 9/2004 | Hansen | H04L 7/033 |
| | | | 702/79 |
| 2008/0183931 A1* | 7/2008 | Verm | G06F 12/10 |
| | | | 710/260 |
| 2013/0212682 A1* | 8/2013 | McClure | G06F 21/577 |
| | | | 726/25 |
| 2013/0339684 A1 | 12/2013 | Alexander et al. | |
| 2013/0339702 A1 | 12/2013 | Greiner et al. | |
| 2017/0060579 A1* | 3/2017 | Vincent | G06F 9/3871 |
| 2019/0042802 A1* | 2/2019 | Trikalinou | G06F 21/75 |
| 2019/0155682 A1* | 5/2019 | Sinha | G06F 11/0766 |

OTHER PUBLICATIONS

Disclosed Anonymously "Star: an Executable Software System Specification Language"; IP.com No. IPCOM000202126D; IP.com Publication Date: Dec. 4, 2010; 95 Pages.

IBM "Universal Programming Context for Contextual Programming"; IP.com No. IPCOM000174815D; IP.com Publication Date: Sep. 25, 2008; 3 Pages.

Linux Defenders and Luc Maisonobe "Automatic Differentiation From Compiled Code"; IP.com No. IPCOM000179534D; IP.com Publication Date: Feb. 16, 2009; 6 Pages.

Wampler; "Software Requirements Specification"; Gemini Software Design Team—Gemini Project; Document No. SPE-C-G0014, Issue No. 2; Jun. 6, 1995; 96 Pages.

* cited by examiner

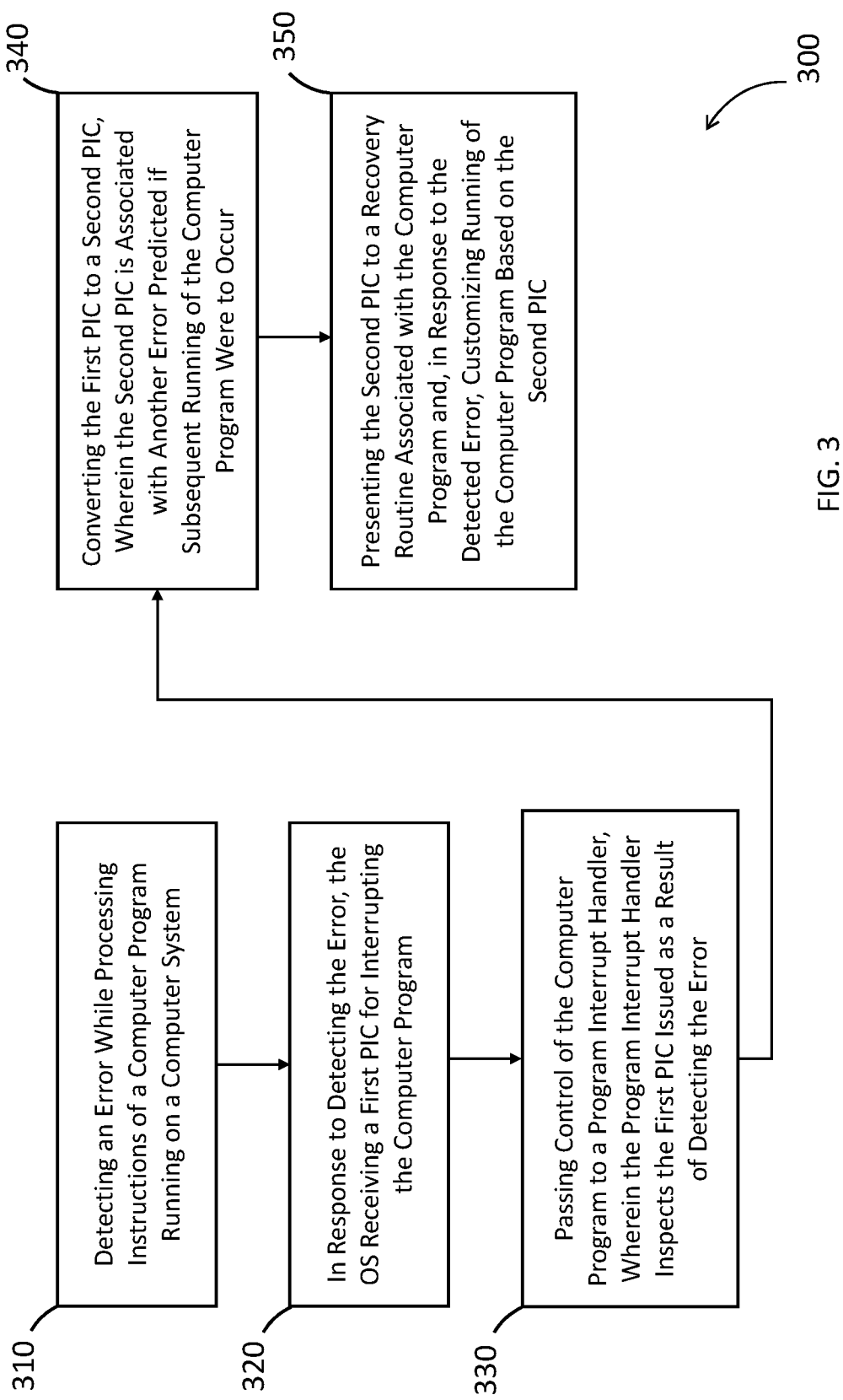

PROGRAM INTERRUPT CODE CONVERSION

BACKGROUND

The invention relates generally to detecting computer program errors and issuing program interrupt codes (PICs) and, more particularly, to converting a PIC into another different PIC in anticipation of one or more not yet detected errors from the subsequenting running of the computer program.

In system programming, an interrupt is a signal to the processor emitted by hardware or software of a computer system indicating an event needs attention. The processor of the computer systems responds by suspending its current activities. In other words, when an error occurs, the hardware or software produces a computer program interrupt. There are many possible program interrupts. Once the computer program is interrupted, a program interrupt handler of an operating system (OS) obtains control of an interrupted computer program. In such a case, the program interrupt handler typically provides information including the PIC to a recovery routine associated with the computer program in order to reconcile the error. However, proper interrupt handling is important. The interrupt code produced for the recovery routine might not always be the best interrupt code for reconciling what is happening with the computer program. What is needed is validation beyond the current interrupt and anticipation of the next interrupt from the subsequent running of the computer program.

SUMMARY

According to a non-limiting embodiment, a computer implemented method for reconciling a program interrupt is provided. The method includes detecting an error while processing instructions of a computer program running on a computer system. The method also includes, in response to detecting the error, the OS receiving a first program interrupt code (PIC) for interrupting the program. Control of the computer program is then passed to a program interrupt handler of the OS, wherein the program interrupt handler inspects the first PIC received as a result of detecting the error. The method then includes converting the first PIC to a second PIC, wherein the second PIC is associated with another error predicted when the subsequent running of the computer program occurs. Also, the method includes presenting the second PIC to a recovery routine associated with the computer program and, in response to the detected error, customizing running of the computer program based on the second PIC.

According to another non-limiting embodiment, a system for reconciling a program interrupt is provided. The system includes an OS of a computer system where the OS includes a program interrupt handler. The system also includes a computer program running on the computer system. An error is detected while processing instructions of the computer program and a first PIC is received by the OS of the computer system. Control is then passed to the program interrupt handler of the operating system in response to the detected error. Also, the system includes a second PIC converted from the first PIC, wherein the second PIC is associated with another error predicted when subsequent running of the computer program occurs. Then, the system includes a recovery routine associated with the computer program, wherein the second PIC is presented to the recovery routine in order to customize running of the computer program in response to the detected error.

The computer system includes an electronic computing interface with a plurality of related code blocks and stored dependency information generated from the execution of one or more of the code blocks. The dependency information tracks information associated with a user's actions while developing the computer program. A displayed notification in the electronic computer interface indicates when one or more problems or inconsistencies exist between code blocks based on the dependency information.

According to yet another non-limiting embodiment, a computer program product is provided. The computer program product includes a computer readable storage medium having program instructions embodied therewith, the program instructions executable by a computer processor to cause the computer processor to perform a method for reconciling a program interrupt. A non-limiting example of the method includes detecting an error while processing instructions of the computer program running on a computer system. The method also includes, in response to detecting the error, the OS receiving the first PIC for interrupting the computer program. Control of the computer program is then passed to a program interrupt handler of the OS, wherein the program interrupt handler inspects the first PIC received as a result of the detect error. Also, the method includes converting the first PIC to a second PIC, wherein the second PIC is associated with another error predicted when subsequent running of the computer program occurs. Then, the method includes presenting the second PIC to a recovery routine associated with the computer program and, in response to the detected error, customizing running of the computer program based on the second PIC.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

FIG. 3 is a flow diagram illustrating a method for reconciling a program interrupt according to one or more embodiments of the present invention.

DETAILED DESCRIPTION

Figure 1:
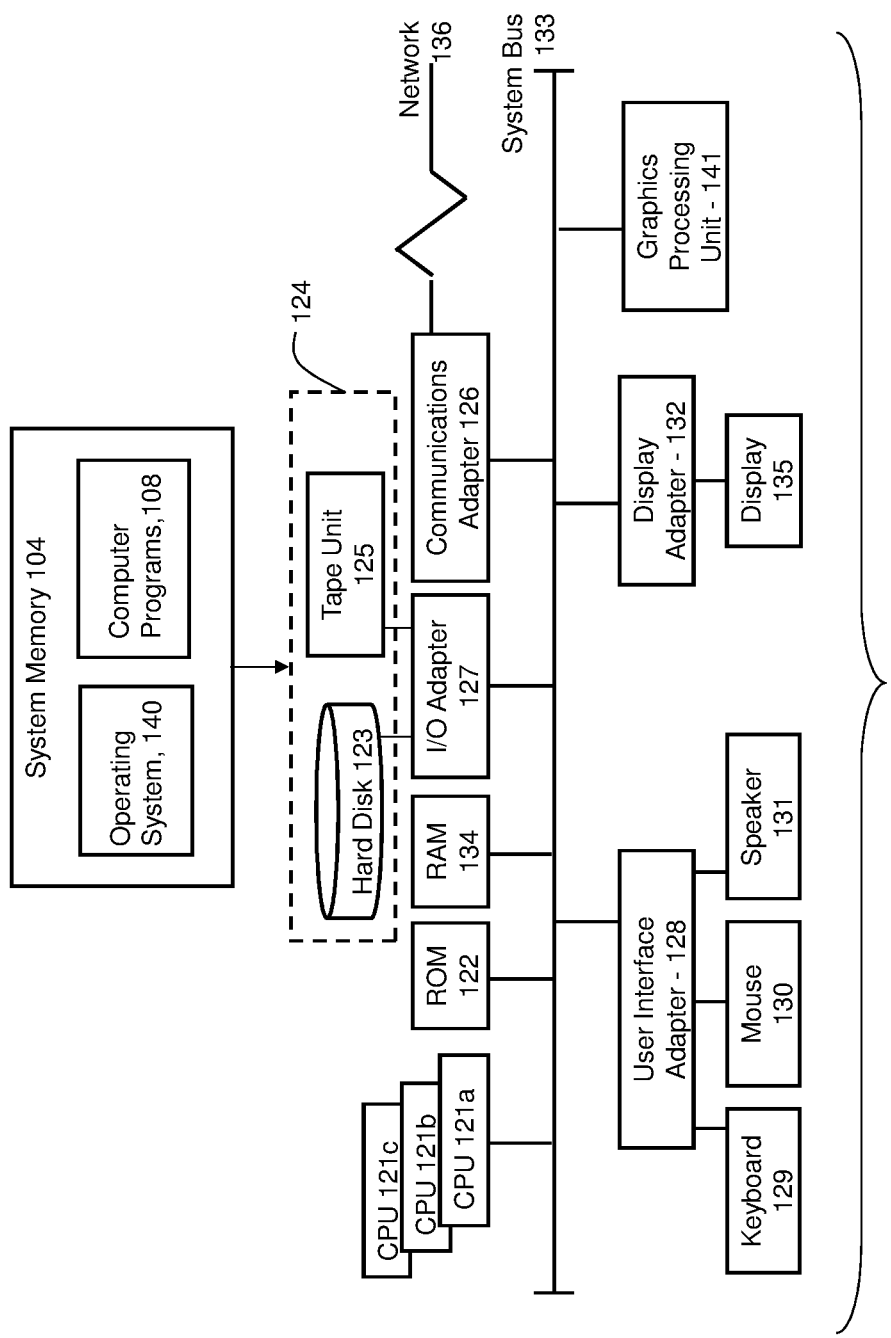
FIG. 1 is a block diagram illustrating a computer system capable of generating and implementing a program interrupt for a computer program running on the computer system in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring now to FIG. 1, a computer system 100 is illustrated according to a non-limiting embodiment. In FIG. 1 the computer system 100 is shown in the form of a general-purpose computer device, which also may be referred to as a processing device, but may otherwise be, for example, a mobile telephone, a smartphone, a tablet personal computer, a laptop computer, and the like, for implementing the teachings herein.

The components of computer system 100 may include, but are not limited to, one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage device 125 or any other similar component. I/O adapter 127, hard disk 123, and tape storage device 125 are collectively referred to herein as mass storage 124.

Still referring to FIG. 1, depending on the configuration and type of computer system 100, system memory 104 comprises, but is not limited to, volatile storage (e.g., random access memory), non-volatile storage (e.g., read-only memory), flash memory, or any combination of such memories. According to an aspect, the system memory 104 includes an operating system 140 and one or more computer programs 108 or computer program modules suitable for running software applications. The operating system 140, for example, is suitable for controlling the operation of the computer system 100. Operating system 140 may be stored in mass storage 124. However, the operating system 140 may also be stored in RAM 134 of the computer system 100. Operating systems according to embodiments of the present invention include, for example, UNIX™, Linux™, Microsoft XP™, AIX™, and IBM's i5/OS™. While executing, the operating system 140 and the computer programs 108 perform processes including, but not limited to, one or more of the stages of method 300 illustrated in FIG. 3.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of the processors 121, storage capability including RAM 134 and mass storage 124, input means such as keyboard 129 and mouse 130, and output capability including speaker 131 and display 135. In one embodiment, a portion of RAM 134 and mass storage 124 collectively store the operating system 140 to coordinate the functions of the various components shown in FIG. 1.

Figure 2:
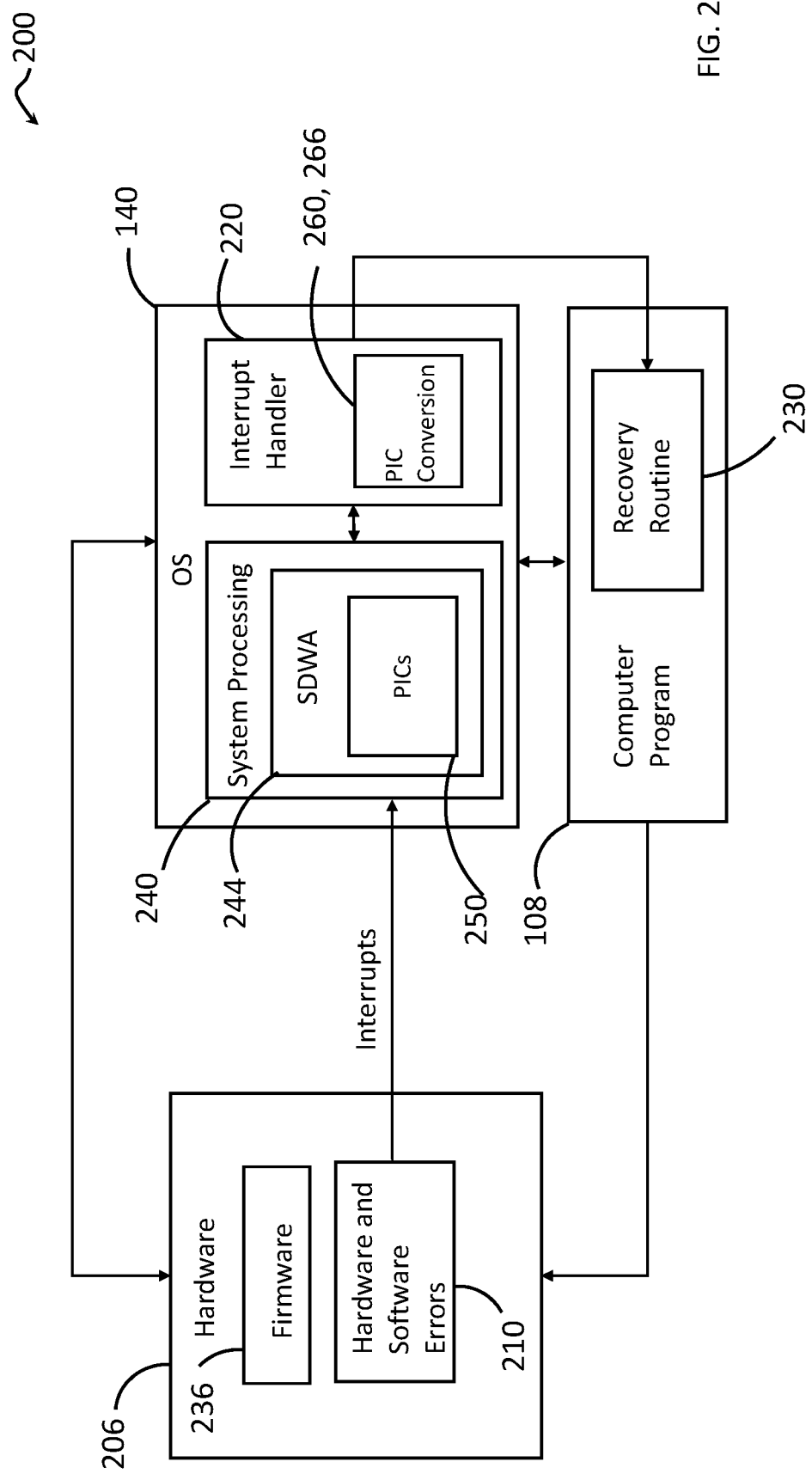
FIG. 2 is a block diagram illustrating a system for reconciling a program interrupt in response to an error and reconciling the error according to one or more embodiments of the present invention.

FIG. 2 is a block diagram illustrating a system 200 for reconciling a program interrupt in response to an error and reconciling the error according to one or more embodiments of the present invention. The system 200 includes the operating system 140 and computer program 108 from FIG. 1. The system 200 also includes hardware 206 that, for example, corresponds with, but is not limited to, one or more of the components of the computer system 100 of FIG. 1.

FIG. 2 also depicts one or more hardware and/or software error indications 210 of the system 200 generated by the computer program 108 or the hardware 206 in response to detecting errors. As a result of the errors in the computer program 108 and the hardware 206, the hardware 206 produces interrupts and presents the interrupts to the operating system 140. Depending on whether the error originated with the computer program 108 or the hardware 206, the corresponding computer program 108 or the hardware 206 is interrupted.

The operating system 140 includes a program interrupt handler 220 and, in response to the program interrupt received by the operating system 140, the firmware 236 of the hardware 206 passes control of the computer program 108 or the hardware 206 to the program interrupt handler 220. Upon the program interrupt handler 220 taking control, the program interrupt handler 220 processes the interrupt received by the operating system 140 and transmits a package of information to a recovery routine 230 of the computer program 108 or to the firmware 236 of the hardware 206.

In one or more embodiments, system processing 240 of the operating system 140 includes a diagnostic program. The diagnostic program is configured to diagnose problems with one or more blocks of the computer program 108 or the hardware 206. For example, the diagnostic program may be a system diagnostic work area 244, commonly referred to as SDWA 244. The SDWA 244 includes a group of data that identifies what occurred that resulted in a particular error. The group of data includes a program interrupt code 250 which identifies one or more reasons for the occurrence of a particular detected error. The program interrupt handler 220 inspects the first program interrupt code 250 received as a result of the hardware 206 detecting the error and then program interrupt handler 220 converts the first program interrupt code 250 to a second program interrupt code 260 as shown at reference number 266. A copy of the first program interrupt code 250 may be saved to a new field in memory such as the system memory 104. The second program interrupt code 260 is associated with another error such as a predicted error that is known, expected or anticipated to occur, based on the current context or operational status of the computer program 108 when subsequent running of the computer program 108 occurs.

The group of data with the converted program interrupt code 260 is presented to the recovery routine 230 of the computer program 108 or the firmware 236 of the hardware 206. The recovery routine 230 or the firmware 206 uses the converted program interrupt code 260, rather than the first program interrupt code 250, to decide how to respond to the detected error. Thus, in response to the detected error, the recovery routine 230 of computer program 108 or the firmware 236 of the hardware 226 is customized based on the second program interrupt code 260 so that normal operation can once again be achieved. In other words, the recovery routine 230 is customized in that it is run, based on what is interpreted to have actually caused the interrupt and, therefore, is run based on the second program interrupt code 260 rather than what the initial program interrupt code 250 had indicated occurred.

In one or more embodiments, the particular program interrupt code 260 that the first program interrupt code 250 is converted to is based on one of several states that can exist for the system memory 104 when being accessed by the user's computer program 108 or the hardware 206. For example, the state of the system memory 104 may be that all the structure needed to access the system memory 104 is present and the setup for the request for referencing the system memory 104 is valid. In another state, all the structure is present and setup, but the request is not valid for referencing the system memory 104. Also, there may be a state where not all the structure is set up, but the computer system 100 is willing to set it up and then redrive the request. In another embodiment, the operating system 140 might instead know that the data structure is not set up properly but, if it were, the request would still be invalid. In such case, the request to access the system memory 104 would fail and would not be redriven. One or more other states may also exist for referencing the system memory 104.

Thus, there is a hierarchy of situations under which problems might or might not be known to the operating system 140 of the computer system 100 and the program interrupt handler 220 assesses the current context or the operational status of the request of the computer program 108 referencing the system memory 104 and any other errors that may be known, predicted or anticipated to occur from subsequent running or operation of the computer program 108 or the hardware 206 in order determine what program interrupt code the first program interrupt code 250 should be converted to. The interrupt handler 220 can determine whether an operational status of the computer program 108 is valid via the diagnostic program, such as the SDWA, of the computer system 100.

When an error occurs, diagnostic information is gathered for the error and placed in a SDWA control block. The recovery routine 230 can request a record of the diagnostic information from the SDWA. In one or more environments, the first program interrupt code is converted to the second program interrupt code if the operational status of the computer program 108 is not valid. Otherwise, if the operational status of the computer program 108 is valid, the first program interrupt code is presented to the recovery routine 230 of the computer program 108. Also, the first program interrupt code issued as a result of the error and received by the operating system 140 is compared with the second program interrupt code converted from the first program interrupt code as a result of the operational status of the computer program 108 being invalid. The comparison can then be used to determine the likelihood that the operating system 140 will validate beyond the current interruption.

In order to address or preempt compatibility issues, there are situations or circumstances when it is important to surface to the recovery routine 230 or the firmware 206 a particular type of program interrupt code referred to as a protection exception rather than the program interrupt code corresponding with the initial interruption. In other words, the protection exception is presented to the recovery routine 230 or the firmware 236 as opposed to the program interrupt code that resulted in the initial interruption. A segment fault or a page fault are examples of protection exceptions. For example, when a user computer program 108 is running in a new environment such as a new operating system, if the user computer program 108 has been modified, or if there has been a change in the operational context of the computer program 108, a program interrupt code produced as a result of an interrupt may not be a protection exception. Thus, in some cases it would then be desirable to convert the initial program interrupt code into some other program interrupt code in response to an interrupt because the recovery or the subsequent operation of the computer program 108 or the hardware 206 would be more efficient. For example, as a result of the conversion, it would no longer be necessary to run through some particular faults. Also, it could be more efficient as a result of converting to the second program interrupt code and presenting that second program interrupt code to the recovery routine 230 in that in some situations additional memory would not then be required for creating new data structures. Moreover, in one or more embodiments, converting to the second program interrupt code for presentation to the recovery routine 108 would be beneficial for implementing security updates.

In any case, it is still desirable to have the recovery routine 230 do what was originally intended prior to the change in environment, change in context or the modification. In other words, converting the first program interrupt code to the second program code/protection exception for the recovery routine 230 or the firmware 236 allows the user computer program 108 or the hardware 206 to can handle the error and then still work as originally intended despite having had some type of change associated with the interruption and the initial program interrupt code. Thus, the computer program 108 will still run because it received a protection exception. In one or more embodiments, the first program protection code initially provided as a result of the interruption may be referred to as a physical protection whereas the second program protection code, following the conversion, may be referred to as a logical protection exception.

Turning now to FIG. 3, a computer implemented method 300 for reconciling a program interrupt is illustrated according to a non-limiting embodiment. The flow diagram of FIG. 3 illustrates the method 300 that includes process block 310 for detecting, via an operating system (OS) of a computer system, an error while processing instructions of a computer program running on the computer system. The method 300 also includes process block 320 for, in response to detecting the error, the OS receiving a first program interrupt code (PIC) and interrupting the computer program and process block 330 for the firmware 236 of the hardware 206 passing control of the computer program to a program interrupt handler 220 of the OS, wherein the program interrupt handler inspects the first PIC issued as a result of detecting the error. Also, the method 300 includes process block 340 for converting the first PIC to a second PIC, wherein the second PIC is associated with another error predicted when subsequent running of the computer program occurs. Then, the method 300 includes process block 350 for presenting the second PIC to a recovery routine associated with the computer program and, in response to the error detected by the firmware of the hardware of the computer system, customizing running of the computer program based on the second PIC.

The computer implemented method 300 may also include one or more other process blocks. In one or more embodiments, the method 300 can include determining whether an operational status of the computer program is valid via a diagnostic program of the computer system. The method 300 can also include where the first PIC is converted to the second PIC if the operational status of the computer program is not valid. In one or more embodiments, the second PIC is a protection exception. Also, the method 300 may include predicting the other error, wherein the second PIC, converted from the first PIC, is based on the prediction of the other error when subsequent running of the computer program occurs. The method 300 can include where the diagnostic program is a system diagnostic work area (SDWA).

The method 300 may include saving the first PIC in a new field in memory. Also, the method 300 may include comparing the first PIC issued as a result of the detected error with the second PIC converted from the first PIC as a result of the operational status of the computer program being invalid. The method 300 can include, if the operational status of the computer program is valid, presenting the first PIC to the recovery routine of the computer program. The second PIC is a protection exception.

In one or more embodiments, the method 300 includes determining whether an operational status of the computer program is valid via a diagnostic program of the computer system, wherein determining the operational status comprises determining a memory state of the computer system, and wherein the memory state comprises one of: a data structure is present and a request to access memory is valid; the data structure is present, but the request is not valid for accessing the memory; and the data structure is not present, but the OS can set up the data structure.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a computer implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for reconciling a program interrupt, the method comprising:

receiving a program interrupt code (PIC) for interrupting a computer program running on a computer system, the PIC being generated in response to detecting an error while processing instructions of the computer program;

passing control of the computer program to a program interrupt handler, wherein the program interrupt handler inspects the PIC received as a result of detecting the error;

determining whether an operational status of the computer program is valid via a diagnostic program of the computer system;

converting the PIC to a protection exception that is associated with another error predicted during a subsequent running of the computer program;

comparing the PIC issued as a result of the error with the protection exception converted from the PIC as a result of the operational status of the computer program being invalid; and presenting the protection exception to a recovery routine associated with the computer program during the subsequent running of the computer program, thereby customizing running of the computer program based on the protection exception.

2. The computer implemented method of claim 1 wherein the PIC is converted to the protection exception if the operational status of the computer program is not valid.

3. The computer implemented method of claim 1 further comprising predicting the another error, wherein the protection exception, converted from the PIC, is based on the prediction of the another error when subsequent running of the computer program occurs.

4. The computer implemented method of claim 1 wherein the diagnostic program is a system diagnostic work area (SDWA).

5. The computer implemented method of claim 1 further comprising presenting the PIC to the recovery routine of the computer program based on a determination that the operational status of the computer program is valid.

6. The computer implemented method of claim 1 further comprising saving the PIC in a new field in memory.

7. The computer implemented method of claim 1 wherein at least the receiving is performed by an operating system (OS), the method further comprising determining whether an operational status of the computer program is valid via a diagnostic program of the computer system, wherein determining the operational status comprises determining a memory state of the computer system, and wherein the memory state comprises one of:
- a data structure is present and a request to access memory is valid;
- the data structure is present, but the request is not valid for accessing the memory; and
- the data structure is not present, but the OS can set up the data structure.

8. The computer implemented method of claim 1, wherein converting the PIC to the protection exception allows the computer program, during the subsequent running, to handle the error and continue working as originally intended despite a change associated with the interruption and the PIC.

9. A system for reconciling a program interrupt, the system comprising:
- a computer system having an operating system (OS) running a computer program, the OS comprising instructions for:
- receiving a program interrupt code (PIC) for interrupting the computer program running on the computer system, the PIC being generated in response to detecting an error while processing instructions of the computer program;
- passing control of the computer program to a program interrupt handler of the OS, wherein the program interrupt handler inspects the PIC received as a result of detecting the error;
- determining whether an operational status of the computer program is valid via a diagnostic program of the computer system;
- converting the PIC to a protection exception, wherein the protection exception is associated with another error predicted during a subsequent running of the computer program;
- comparing the PIC issued as a result of the error with the protection exception converted from the PIC as a result of the operational status of the computer program being invalid; and
- presenting the protection exception to a recovery routine associated with the computer program during the subsequent running of the computer program, thereby customizing running of the computer program based on the protection exception.

10. The computer system of claim 9 wherein the diagnostic program is a system diagnostic work area (SDWA).

11. The computer system of claim 9 wherein the OS further comprises instructions for comparing the PIC issued as a result of the error with the protection exception converted from the PIC as a result of the operational status of the computer program being invalid.

12. The computer system of claim 9 wherein the OS further comprises instructions for further comprising presenting the PIC to the recovery routine of the computer program based on a determination that the operational status of the computer program is valid.

13. The computer system of claim 9 wherein the PIC is saved in memory in response to having been converted to the protection exception.

14. A computer program product comprising a computer readable storage medium having program instructions of a computer program embodied therewith, the program instructions executable by a computer processor of a computer system to cause the computer processor to perform a method for reconciling a program interrupt, the method comprising:
- receiving a program interrupt code (PIC) for interrupting a computer program, the PIC being generated in response to detecting an error while processing instructions of the computer program;
- passing control of the computer program to a program interrupt handler, wherein the program interrupt handler inspects the PIC issued as a result of detecting the error;
- determining whether an operational status of the computer program is valid via a diagnostic program of the computer system;
- converting the PIC to a protection exception, wherein the protection exception is associated with another error predicted during a subsequent running of the computer program;
- comparing the PIC issued as a result of the error with the protection exception converted from the PIC as a result of the operational status of the computer program being invalid; and
- presenting the protection exception to a recovery routine associated with the computer program during subsequent running of the computer program, thereby customizing running of the computer program based on the protection exception.

15. The computer program product of claim 14 further comprising predicting the another error, wherein converting the PIC to the protection exception is based on an operational status of the computer program when subsequent running of the computer program occurs resulting in the prediction of the another error.

* * * * *